United States Patent
Huang

(10) Patent No.: US 6,811,653 B2
(45) Date of Patent: Nov. 2, 2004

(54) MULTI-PURPOSE PAPER, MANUFACTURING METHOD THEREOF AND THE APPLICATION THEREOF

(75) Inventor: Ching-Chung Huang, Taipei (TW)

(73) Assignee: Yuen Foong Yu Paper MFG Co., Ltd., Taipei (TW)

( * ) Notice: Subject to any disclaimer, the term of this patent is extended or adjusted under 35 U.S.C. 154(b) by 0 days.

(21) Appl. No.: 10/001,318

(22) Filed: Oct. 26, 2001

(65) Prior Publication Data

US 2003/0079846 A1 May 1, 2003

(51) Int. Cl.[7] .................... D21H 17/03; D21H 23/00; D21H 17/28; D21H 27/30; A01G 7/00
(52) U.S. Cl. ................ 162/158; 162/101; 162/161; 162/181.1; 162/181.2; 162/181.4; 162/165; 162/168.3; 162/117; 162/123; 162/109; 162/175; 162/111; 162/147; 47/9; 47/56
(58) Field of Search ................ 162/109, 117, 162/123, 125, 127, 129, 146, 141, 147, 157.1, 158, 164.1, 101, 164.3, 164.6, 178, 168.1, 189, 168.3, 175, 181.1, 181.2; 47/32.7–32.8, 65.5, 65.9, 74, 77, 81, 57.6, 56, 9

(56) References Cited

U.S. PATENT DOCUMENTS

| | | | | |
|---|---|---|---|---|
| 2,826,865 | A | * | 3/1958 | Chohamin ............... 47/56 |
| 2,909,003 | A | * | 10/1959 | Marshall ............... 47/56 |
| 3,299,566 | A | * | 1/1967 | MacMullen ............... 47/9 |
| 4,510,019 | A | * | 4/1985 | Bartelloni ............ 162/141 |
| 4,963,230 | A | * | 10/1990 | Kawase et al. ........ 162/129 |
| 5,061,345 | A | * | 10/1991 | Hoffman .............. 162/125 |
| 5,415,736 | A | * | 5/1995 | Grether .............. 162/111 |
| 5,470,434 | A | * | 11/1995 | Terasawa et al. ...... 162/117 |
| 5,802,763 | A | * | 9/1998 | Milstein ............... 47/56 |
| 5,928,472 | A | * | 7/1999 | Watkins .............. 162/132 |
| 5,934,011 | A | * | 8/1999 | Ishioka et al. .......... 47/56 |
| 6,171,443 | B1 | * | 1/2001 | Goettmann et al. ..... 162/135 |
| 6,200,416 | B1 | * | 3/2001 | Brotto et al. ............ 162/4 |
| 6,214,601 | B1 | * | 4/2001 | Batts et al. ........... 435/243 |
| 6,258,210 | B1 | * | 7/2001 | Takeuchi et al. ....... 162/115 |
| 6,344,110 | B1 | * | 2/2002 | Reiner et al. .......... 162/109 |
| 6,355,137 | B1 | * | 3/2002 | Staib .................. 162/5 |
| 6,416,624 | B1 | * | 7/2002 | Nielsen et al. ........ 162/155 |
| 6,429,253 | B1 | * | 8/2002 | Guerro et al. ......... 524/514 |
| 6,446,386 | B1 | * | 9/2002 | Holloway .............. 47/56 |
| 6,447,640 | B1 | * | 9/2002 | Watson et al. ......... 162/101 |
| 6,490,827 | B2 | * | 12/2002 | Hasegawa et al. ....... 47/65.7 |
| 6,544,912 | B1 | * | 4/2003 | Tanio et al. .......... 442/408 |
| 2003/0079846 | A1 | * | 5/2003 | Huang ................. 162/158 |
| 2004/0016527 | A1 | * | 1/2004 | Huang ................. 162/101 |
| 2004/0060677 | A1 | * | 4/2004 | Huang ................. 162/158 |

FOREIGN PATENT DOCUMENTS

| | | | |
|---|---|---|---|
| CN | 1449666 | * 10/2003 | .......... A01N/65/00 |

OTHER PUBLICATIONS

G. A. Smook, "Handbook for Pulp and Paper Technologists," 1992, Angus Wilde Publication, Second Edition, Chapters 9 and 14.*

* cited by examiner

Primary Examiner—José A. Fortuna
(74) Attorney, Agent, or Firm—Volpe and Koenig, P.C.

(57) ABSTRACT

A multi-purpose paper, a manufacturing method thereof, and an application thereof are provided. The method of manufacturing the multi-purpose paper comprises steps of (a) providing a papermaking material and obtaining a clean paper pulp by treating the papermaking material, (b) adding at least one functional additive into the clean paper pulp to form the multi-purpose paper, and (c) processing the multi-purpose paper to form thereon an uneven surface structure. The cultivating paper has the combined functions of weed control, pest control, supplying the required nutrients to plants to help develop the root system, maintaining moisture and breath for the root system. The multi-purpose paper can be carriers of agricultural antagonistic microorganisms and serve as the basic functional substrate for weed control, pest control, sowing, growing seedlings, fertilization, fertilizer saving, manpower saving and organic cultivating.

32 Claims, 2 Drawing Sheets

MULTI-PURPOSE PAPER, MANUFACTURING METHOD THEREOF AND THE APPLICATION THEREOF

FIELD OF THE INVENTION

The present invention relates to a multi-purpose paper, a manufacturing method thereof, and an application thereof.

BACKGROUND OF THE INVENTION

Generally, the agricultural production comprises the steps of soil preparation, sowing, fertilization, hand weeding and harvesting, each of which requires a huge amount of manpower. Particularly, the steps of hand weeding and harvesting are the most manpower-consuming processes. To achieve the purposes of weeding and growing seedling, the farmers conventionally cover a plastic cloth over the land to retard the growth of weeds and use a plastic seedling-growing plate. However, after the crops are harvested or the seedlings are transplanted, the farmer has no ideal way in dealing with the useless plastic cloth and plate. Due to the plastic cloth and plate cannot be decomposed naturally, it tends to cause the second pollution once the plastic cloth and plate are discarded. In addition, the plastic cloth and plate will result in poor water and air-permeability and influence the ecological environment of soil microorganisms, root system of cultivated seedling, and the growth of crops.

The paper product has the advantage of being decomposable in natural environment easily. After achieving the purpose of agricultural producing, it can be naturally disintegrated and integrated as part of soil after plowing so that it has no disadvantages of recycling, handling the discards and environmental pollution as compared to those by traditional plastic cloth and plate. Therefore, it is desired to develop an agricultural paper material to replace the traditional plastic cloth and plate, or the cultivating medium, which it would be an advanced development in the aspects of economic benefits and environmental protection.

The papermaking material comes typically from the natural organic wood fibers, which are also excellent carriers for microorganisms. However, the conventional paper contains large amounts of chemical additives which have nothing to do with the required features of agricultural crops. Thus the conventional waste paper is not suitable to be used in agricultural application of farmland cultivating.

Therefore, if the functional components can be added and adjusted in the papermaking material during the manufacturing process in making the paper product, it cat be sufficiently applied in agriculture as desired. It is therefore an object of the present invention to provide a multi-purpose paper for being applied in agricultural planting and cultivating to solve the problems resulting from weed control, pest control, sowing, growing seedlings, fertilization, fertilizer saving, manpower saving and special cultivating, thereby the agricultural producing possibly becoming a permanent operation.

SUMMARY OF THE INVENTION

It is therefore an object of the present invention to provide a multi-purpose agricultural: paper having the features of non-polluting, biodegrading and strong light-blocking ability so that it can be used as carriers of antagonistic microorganisms for being applied in plant cultivating and being used as functional basic materials to control weeds, control pests, sow seeds, grow seedlings, supply fertilizer, save fertilizer, save manpower and cultivate special species.

According to the present invention, a method of manufacturing the multi-purpose paper comprises steps of (a) providing a papermaking material and obtaining a clean paper pulp by treating the papermaking material, (b) adding at least one functional additive into the clean paper pulp to form the multi-purpose paper, and (c) processing the multi-purpose paper to form thereon an uneven surface structure.

Preferably, the papermaking material is one selected from a group consisting of waste cardboard case fibers, the remaining basic materials after being taken away the bottom surface paper of waste cardboard case, biodegradable plant fibers and polymer fibers.

In accordance with the present invention, the step (b) comprises steps of classifying, pulp-dispersing, coarse pulp-clarifying, fiber-separation, coarse screening, fine-pulp-clarifying, heat-dispersion, fine screening, bleaching, pulp-washing and pulp-refining.

In accordance with the present invention, the functional additive is one selected from a group consisting of Camellia seed cake's powder, calcium carbonate, dry strength agent, wet strength agent, weed control agent, pest control agent and bacterial control agent.

In accordance wit the present invention, the Camellia seed cake's powder is added into the clean paper pulp at 1% by weight for preventing golden apple snails (Pomacea Canaliculata Lamarck) and increasing dispersive level of fibers during manufacturing.

Preferably, the calcium carbonate is added into the clean paper pulp at a dosage based on classification of the papermaking material, sieving ratio of fibers, desired water-absorbing ability and air permeability of the paper for increasing the physical strength of the paper and promoting the proliferation of microorganisms.

Preferably, the weed control agent is one of inorganic and organic packing materials selected from a group consisting of black carbon, silicon dioxide and titanium dioxide.

Preferably, the dry strength agent is one of acidic and neutral agents of one of anionic and cationic ones selected from a group consisting of melamine formaldehyde resin, polymeric amine-epichlorohydrin resin, phenolic resin, glyoxalated polyacrylamide resin) polyacrylamide resin, raw starch, and modified starch.

Preferably, the wet strength agent is one of acidic and neutral agents of one of anionic and cationic ones selected from a group consisting of melamine formaldehyde resin, polymeric amine-epichlorohydrin resin, phenolic resin, and glyoxalated polyacrylamide resin.

Preferably, the uneven surface structure is an embossed structure.

Preferably, the uneven surface structure is a corrugated structure.

Preferably, the multi-purpose paper has a pH value ranging between about 6 and about 7.

Preferably, the multi-purpose paper includes a corrugated paper layer having a basic weight ranged from 90 $g/m^2$ to 150 up $g/m^2$ and a surface paper layer having a basic weight ranged from 90 $g/m^2$ to 300 up $g/m^2$ in order to have high wet strength, water-preventing ability and water-permeating ability.

Preferably, the multi-purpose paper is a paper substrate with a thickness ranged from 0.2 mm to 0.3 mm.

Preferably, the paper substrate has a water-absorbing ability larger than Cobb, 1 Min, 20 gsm and a wet-rupture strength in longitudinal/transverse direction lower than 1.0 $kg/m^2$ after 2 hours immersion.

Preferably, the paper substrate has a wet-breaking strength in longitudinal/transverse direction lower than 1.0 kg/m² after 2 hours immersion.

Preferably, the multi-purpose paper has an air permeability larger than about 50 sec/100 cc.

Preferably, the multi-purpose paper is rolled up, and cut into a specific shape in use.

Preferably, the paper is directly obtained from a waste cardboard case, and can be used in one of a group consisting of large area fields, home gardening, golf fields, paddy fields and dry farmlands of general or organic farming.

Preferably, the multi-purpose paper can be used in one of domestically cultivating box containing organic soil or organic medium and industrial applications selected from a group consisting of indoor and outdoor net supports, papery recyclable cultivating plate, and artificial indoor planting system with devices of temperature control, cold and hot water pipes, and light control.

Preferably, the uneven surface structure is used for sowing at least a seed thereon, and the method further includes a fixing layer for fixing the seed, wherein the fixing layer comprises manufacturing steps of (a) providing a papermaking material and obtaining a clean paper pulp by treating the papermaking material; and (b) adding at least one functional additive into the clean paper pulp to form the multi-purpose paper.

Preferably, the fixing layer is a thin layer die-cast with at least a lattice for positioning and wrapping therein at least the seed.

Preferably, the multi-purpose paper has light-blocking weed-preventive ability and natural porous carriers suitable for proliferating microorganisms thereon so that one of antagonistic microorganism for controlling a specific disease of a plant, natural pest control component and bacterial control agent can be coated, sprayed or immersed thereon and the multi-purpose paper can be used for covering one of land and cultivating medium for one of sowed plant and transplanted plant.

Preferably, the antagonistic microorganism is one of radioactive antagonistic bacterium for resisting root nodule nematode and antagonistic bacterium of radish seedling wilt disease.

Preferably, the natural pest control component is selected from a group consisting of sodium dodecyl sulfate (SDS), linear alkyl sulfate (LAS), agricultural waste containing saponin and methyl alcohol extracted from one of Camellia seed cake and tobacco powder.

Preferably, the one of the antagonistic microorganism, the pest control component and the bacterium control agent can be coated on the surface of the paper by an adhesive material, wherein the adhesive material is a natural neutral material of one of natural amylum gel and carboxymethyl cellulose (CMC).

Preferably, the method further comprises a step of coating fertilizer powder or capsule on the paper by one of spraying and coating technologies, to form a slowly releasing organic or chemical fertilizer coating, thereby providing required nutrition for the plant.

Preferably, the method adjusts a formula of the coating according to requirements and features of a specific crop, and sprays or coats on a specific position of the paper.

Preferably, the method further comprises a step of punching plural holes on the paper to partly pierce at least one of the fertilizer coating and the uneven surface structure, and inlaying the seed in punched holes to allow the seed to root downwardly upon germination and to guide roots of the plant to grow in a diverging room formed under the uneven surface structure.

Preferably, the method further comprises one of a step of attaching a fixing layer on the paper by an adhesive material for securing the seed on the paper, and a step of using the paper oppositely according to a specific requirement of crops, wherein the adhesive material is one selected from a group consisting of glue spray, starch and carboxymethyl cellulose (CMC).

Preferably, the seed is further treated according to features of the seed by using a chemical seed-treating agent cooperating with one selected from a group consisting of alginic soda acid, gelatine and polyvinyl alcohol for protecting the germination of the seed, wherein the chemical seed-treating agent is selected from a group consisting of ethylene glycol, propylene glycol, butylenes glycol, polyethylene glycol, polypropylene glycol, polybutylene glycol, glycerine and 2-octyl glycol.

Preferably, the seed is selected from a group consisting of seeds covered with a paper pulp, seeds covered with a polymer compound, seeds of grains, seeds of medicinal herbs, seeds of economical plant, seeds of greensward, seeds of vegetables, seeds of fruits, seeds of flowers and artificial seeds cultivated from a cell culture.

Preferably, the method further comprises steps of overall embossing, punching holes, and making the uneven surface structure according to requirements of a specific crop, to increase water-absorbing ability, air permeability, size stability and limpness of dry and wet alternation.

According to another aspect, a method of manufacturing a multi-purpose paper for cultivating comprising steps of (a) providing a papermaking material, (b) adding at least one functional additive into said papermaking material to form the multi-purpose paper, and (c) processing the multi-purpose paper to form the multi-purpose paper thereon an uneven surface structure.

According to another aspect, a method of manufacturing a multi-purpose paper for cultivating comprising steps of (a) providing a papermaking material and obtaining a clean paper pulp by treating the papermaking material, (b) adding at least one functional additive into the clean paper pulp to form the multi-purpose paper, and (c) processing the multi-purpose paper to form the multi-purpose paper having an uneven surface structure sowing at least a seed thereon, wherein the uneven surface structure is used for placing thereon the seed and forms thereunder a diverging space to help develop the root system of the seed.

According to a further aspect of the present invention, a multi-purpose paper comprises: a paper body having an uneven surface structure and at least one functional additive distributed or wrapped inside the multi-purpose paper.

In accordance with the present invention, the surface paper of the uneven surface structure has an air permeability larger than 102 sec/100 cc, breaking force larger than 2 kg/cm², dry pulling force in longitudinal direction larger than 4 kg/15 mm, dry pulling force in transverse direction larger than 105 kg/15 mm, wet pulling force in longitudinal direction larger than 3.5 kg/ cm², wet pulling force in transverse direction larger than 1.4 kg/cm², water splash level larger than R3, and gluing ability degree larger than 120 sec.

Preferably, the multi-purpose paper has a basic air permeability larger than about 50 sec/100 cc, except the surface paper of the uneven surface structure has an air permeability larger than 102 sec/100 cc.

Preferably, the multi-purpose paper can be used in one of growing seedling of shallow crops and an operation system of cultivating and obtaining seedling.

Preferably, the at least one seed is covered by one of thin cultivating medium and soil.

The foregoing and other features and advantages of the present invention will be more clearly understood through the following descriptions with reference to the drawings, wherein:

DETAILED DESCRIPTION OF THE PREFERRED EMBODIMENT

Figure 1:
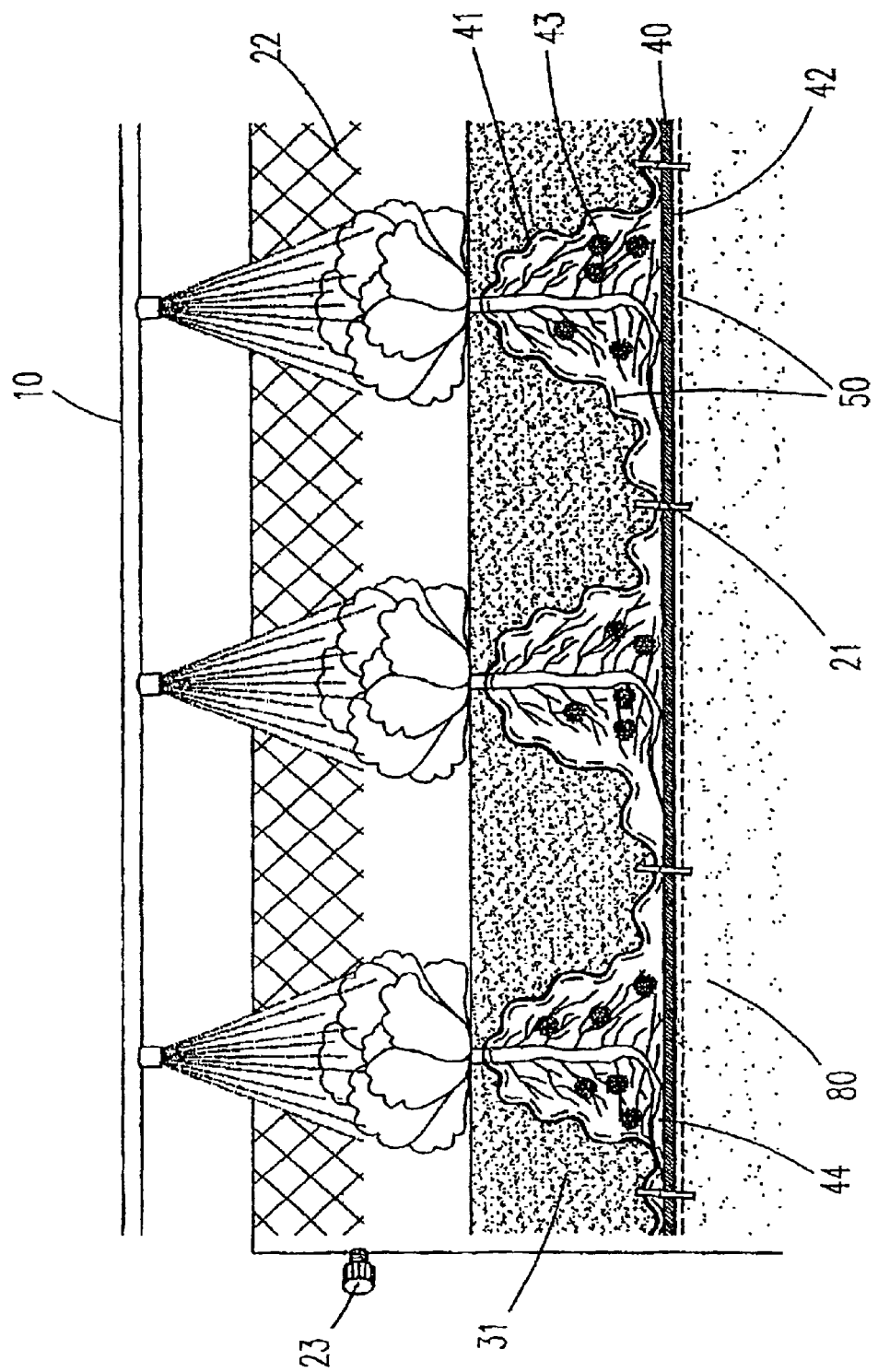
FIG. 1 is al diagram showing the cultivating application of the multi-purpose paper according to a preferred embodiment of the present invention.

The present invention will now described more specifically with reference to the following embodiments. Please refer to FIG. 1 and FIG. 2, which are the diagrams showing the structure and the cultivating application of the multi-purpose paper according to preferred embodiments of the present invention. The main elements are as follows:

1. The pest control microorganism-made agent and fertilizer 43 with long-term effectiveness can be coated on the bottom surface paper of card case, the general waste cardboard case after taken away the bottom surface paper thereof, or the surface paper of the uneven surface structure 41 by spraying and coating to form the coated layer of pest control microorganisms made agent 50. In a special design of seed wrapping lattice, a fixing layer 60 is a thin layer die-cast with at least a lattice for positioning the seed 100 on the surface paper of the uneven surface structure 41 and wrapping the seed 100 with protective agent. The fixing layer 60 must have certain wet-breaking strength and wet-rupture strength after immersion so as to help the germination and the downward growth of the root system.

2. The material of the bottom surface paper 42 is Kraft paper with high air-permeability, high water-permeability, high gluing ability, and high wet-breaking strength.

3. The material of the uneven surface structure 41 is preferable with low wet-breaking strengths high water-permeability, and the feature of easily forming the uneven surface structure.

4. The multi-purpose paper with the uneven surface structure 41 for weed control is fixed by the biodegradable bamboo spike 21 for wind-proof, and a spraying system 10 is mounted on the, top thereof for water supply.

5. The seed 100 and the fertilizer 43 with long-term effectiveness are attached directly on the concave part of the uneven surface structure 41 or wrapped inside the bottom of the uneven surface structure 41. Afterward, the seed 100 is covered by a thin wooden medium 31 or soil to maintain the dampness and suppress the root system to grow downwardly. For short-term crops, the wooden medium 31 is covered on the uneven surface structure 41 with a thickness of 1~2 cm after sowing the seed thereon, to help the germination.

6. For long-term crops, a supporting nylon net 22 having a supporting elevating rack 23 is mounted on the top the multi-purpose paper. The height of the supporting nylon net 22 can be adjusted by the supporting elevating rack 23 to help the plant grow upwardly through supporting the weight without suppressing the root system.

7. For saving manpower, the auto-spraying system 10 is mounted on the top of the multi-purpose paper to supply water, liquid fertilizer, and the nutrient for organic cultivating only.

8. The cultivating system of the present invention can be used for the net support form of elevatedly cultivating, in order to meet the requirements of auto-harvesting, ergonomics of human body and the environmental cultivating on the mountainside land.

9. The multi-purpose paper can be used oppositely, wherein the bottom surface paper 42 is faced upward, the fixing layer 60 is faced downward and placed on the medium or the surface of the soil 80. Then the bamboo spike 21 is used to punch holes on the multi-purpose paper for planting long-term crops such as strawberry and melon to achieve the purposes of weed control, pest control, improving the ground temperature, improving the stability of paper size and easily biodegradable composting. When the seed is attached on the uneven surface structure 41, a tiny hole is provided beneath the seed to let the root system grow downwardly and penetrate the multi-purpose paper and to help the cotyledon grow upwardly.

10. The multi-purpose paper can be applied for growing and obtaining seedlings. For example, the stem of strawberry can be directly planted on the multi-purpose paper for obtaining seedling easily and obtaining excellent root system 44 grew under the uneven surface structure 41.

11. The cultivating system of the present invention can also be applied for long-term crop with deep roots. The cultivating medium is placed under the multi-purpose paper with a thickness of 15~20 cm, wherein the cultivating medium can be placed on the water-preventing papery plate or box. The plate or box can be recycled or composted after use, and a water pipe for adjusting temperature can be mounted therein for stabilizing the growth of the root system.

The present invention discloses a multi-purpose paper made of convertible waste pulp for weed control, pest control, and fertilizing. The papermaking material, is one selected from a group consisting of waste cardboard case fibers, biodegradable plant fibers and polymer fibers. After the steps of classifying, pulp-dispersing, coarse pulp-clarifying, fiber-separation, coarse screening, fine pulp-clarify, heat-dispersion, fine screening, bleaching, pulp-washing and pulp-refining, a clean pulp is obtained and sent to the paper making machine. The waste pulp is treated inside the paper making machine and becomes the paper roll after drying. The paper roll will be treated with the processes of repeated rolling, embossing, making the uneven surface structure, punching holes, sowing, attaching the fixing layer, cutting, rolling and packing, and then becomes the product of multi-purpose paper.

In order to meet the requirements of functional agricultural paper, in the processes of waste pulp treating and paper manufacturing, at least one functional additive is added, such as Camellia seed cake's powder, calcium carbonate, dry strength agent, wet strength agent, weed control agent, pest control agent and bacterial control agent. Alternatively, the functional additive can be immersed, sprayed or coated on the paper making machine and the processing equipments to make the best function or effectiveness of the multi-purpose paper in the present invention.

When the multi-purpose paper is applied for general crop cultivating, the wet strength agent is one of acidic and neutral agents of one of anionic and cationic ones selected from a group consisting of melamine formaldehyde resin, polymeric amine-epichlorohydrin resin, phenolic resin, and glyoxalated polyacrylamide resin. The dry strength agent is one of acidic and neutral agents of one of anionic and cationic ones selected from a group consisting of melamine formaldehyde resin, polymeric amine-epichlorohydrin resin, phenolic resin, glyoxalated polyacrylamide resin, polyacrylamide resin, raw starch, and modified starch.

As for weed control agent, it can be chosen from one of inorganic or organic packing materials selected from a group consisting of black carbon, silicon dioxide and titanium dioxide. The pest control component can be selected from sodium dodecyl sulfate (SDS) and linear alkyl sulfate (LAS). The calcium carbonate can be added into the clean paper pulp at a dosage based on classification of die papermaking material, sieving ratio of fibers, desired water-absorbing ability and air permeability of the paper for increasing the physical strength of the paper aid promoting the proliferation of microorganisms. Or the Camellia seed cake's powder is added into the clean paper pulp at 1% by weight for preventing golden apple snails (Pomacea Canaliculata Lamarck) and increasing dispersive level of fibers during manufacturing.

In order to understand more about the present invention, the related manufacturing process and data are disclosed to describe the feature and idea of the present invention in the following.

In the aspect of manufacturing process, not only the waste paper is fully classified, but also the high purity pulp and the excellent manufacturing equipments are used, wherein the ratio of long fibers and short fibers can be adjusted automatically according to the changeable Canadian Standard Freeness (CSF) of pulp. The using sufficiency of fiber paper strength is fully elevated and the inner fiber structure is improved so that the paper strength is strengthened to the requirements for use in the paddy field without using the chemical agent. In addition, the Wedgewire is used for screening one by one and washing, which can elevate the treating amount under the sieve with small aperture. It might affect the paper strength, remove the substance that is disadvantageous for the manufacturing process, and human body health, and cooperate with the 5% high concentration pulp-milling system to elevate the stability of the manufacturing process and basic quality. In the aspect of paper making process, in order not to use the chemical additive, the low boxed concentration is used, the longitudinal/transverse ratio is adjusted, the transverse basic weight is stabilized, the drying temperature is lowered, and the dust keeper of canvas and drying apparatus is mounted to lower the dampness gradient, all to make sure that the paper has the excellent features of paper strength, water-absorbing and air-permeability to meet the requirements of cultivating crops.

As in the aspect of quality, in order to enhance functions of weed control and stabilizing the cultivating paper, the corrugated paper layer has a basic weight elevated to range from 90 g/m$^2$ to 150 up g/m$^2$, and the paper substrate 40 of the multi-purpose paper has a thickness ranged from 0.2 mm to 0.3 mm. In order to let the paper be covered by the paddy field, the water-absorbing ability is elevated to be larger than Cobb, 1 Min, 20 gsm and a wet-rupture strength in longitudinal/transverse direction lower than 1.0 kg/m$^2$ after 2 hours immersion. In order to transplant the seedling smoothly when planting the non-irrigation crop, the wet-breaking strength in longitudinal/transverse direction is controlled below 1.0 kg/m$^2$ after 2 hours immersion. For the using of the non-irrigation crop and the need of the crop cultivating, the surface paper larger than 90 g/ m$^2$ is embossed to elevate the air permeability larger than about 50 sec/100 cc. Alternatively, the water-preventing agent is coated on the paper to prevent water permeation, the paper is embossed and becomes the uneven surface structure to elevate the water-permeability, air-permeability of root system, rotting-prevention, and dimension stability in paper size under the condition of dry and wet alternation, to increase the utility in different crops and cultivating styles. In addition, one important characteristic of the multi-purpose paper in the present invention is that the papermaking process doesn't add any chemical additive, and maintain the PH value close to neutrality, thereby enhancing the activity of microorganisms and the corps planted thereon. To cooperate with the inoculation of antagonistic microorganisms, metal compound contained in the multi-purpose paper must be controlled lower than a specific value according to the following Table 1 (According to Tappi Test Method T 438 cm-96).

TABLE 1

| Compound | Percentage (%) |
| --- | --- |
| Sodium oxide | 2.17 |
| Magnesium oxide | 3.43 |
| Aluminum oxide | 29.5 |
| Silicon oxide | 41 |
| Sulfur trioxide | 10.4 |
| Calcium oxide | 12.1 |
| Titania | 1.36 |
| Copper | 0.0027 |
| Chromium | 0.00071 |
| Nickel | 0.0033 |
| Iron | 0.06 |
| Manganese | 0.0026 |
| Lead | 0.01 |
| Zinc | 0.0075 |
| Mercury | ND* |
| Arsenic | ND |
| Total chromium | 0.00018 |

*ND means that the percentage of the metal compound is unable to be measured.

Figure 2:
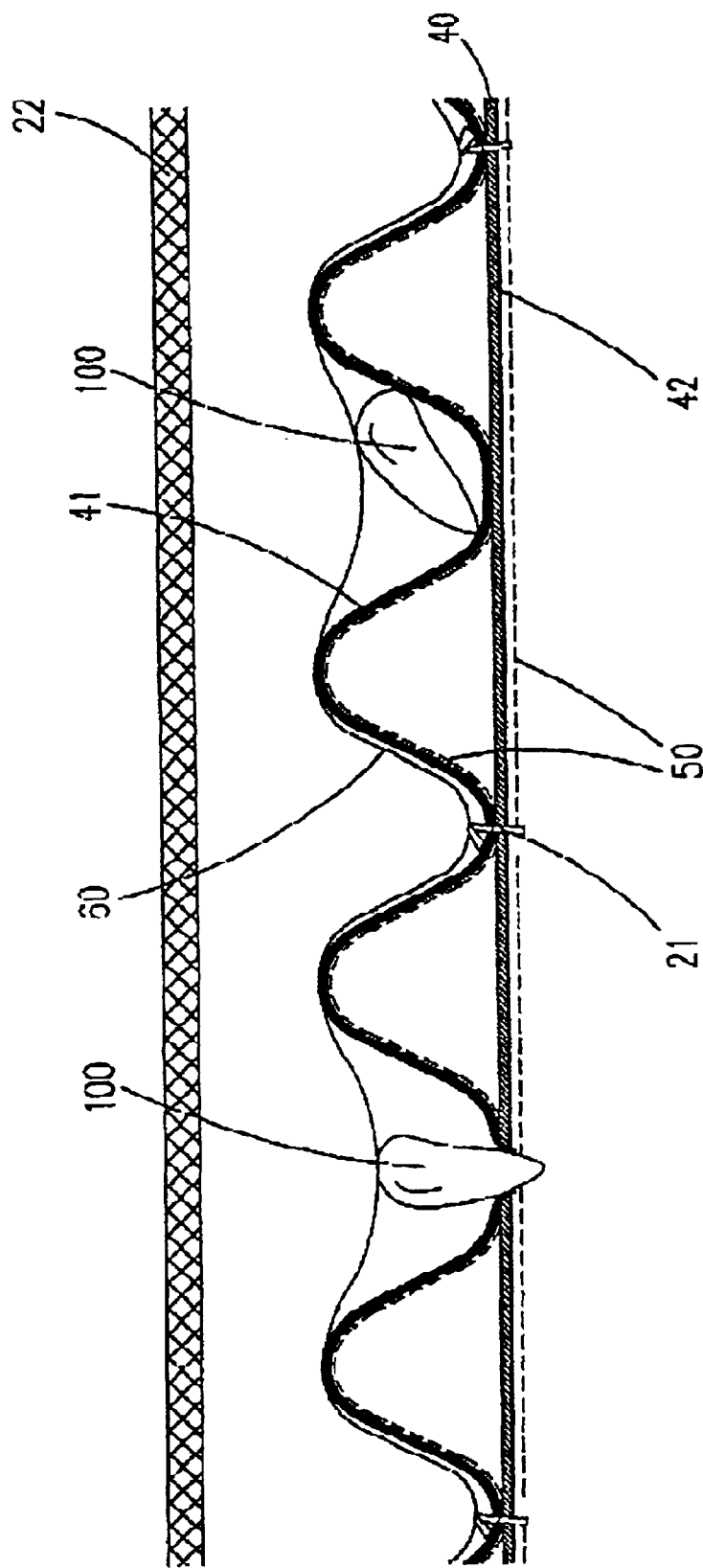
FIG. 2 is a diagram showing the structure of the multi-purpose paper according to a preferred embodiment of the present invention.

Please refer to FIG. 1 and FIG. 2, which are diagrams showing the cultivating application and structure of the multi-purpose paper according to a preferred embodiment of the present invention. The SDS cam be coated or sprayed on the surface of the multi-purpose paper. The spores of high concentration microorganism agent or conidial coating containing natural amylum gel and slowly released organic or chemical fertilizer coating are coated on the side opposite to the SDS coating and the bottom which contacts the soil. In order to allow the SDS coating for preventing golden apple snails, or the microorganism agent coating resisting to low temperature, or Camellia seed cake's coating to remain on the surface of the paper and be coated thereon smoothly, the moisture contained in the paper can be overdried to a percentage of 5. Thereafter, high concentration microorganism agent, conidial containing additive such as natal amylum gel ($10^5$ per ml) or $CaCO_3$, and 2000 ppm SDS are sprayed on <70° C. multi-purpose paper to allow the water to be slightly evaporated and to treat the multi-purpose paper to restore moisture. The multi-purpose paper is then fed to a cooling roller for reducing the temperature to <50° C., stored or reeled up and cut to form the multi-purpose paper, and then processed to make the uneven surface structure.

Moreover, plural holes are punched on the multi-purpose paper to partly pierce at least one of the fertilizer coating and the uneven surface structure 41, and inlaying the seed in punched holes to allow the seed to root downwardly upon germination and to guide roots of the plant to grow in a diverging room formed under the uneven surface structure 41. After spraying the adhesive material such as starch or CMC, a fixing layer 60 (such tissue paper or kitchen napkin with a basic weight of 35 g/m²) is covered on the multi-purpose paper to produce the back pressure to help the seeds root downwardly when germination and help the stem stand erect. The cultivating paper here for sowing has the combined functions of weed control, pest control, supplying the required nutrients to plants to help develop the root system, maintaining moisture and breath for the root system. Alternatively, the paper is embossed and made into the uneven surface structure 41 after treated with the microorganism and fertilizer, and then attached on the bottom surface paper 42 which is treated in the same process and has the features of excellent water-preventing and water-permeability. The sprouting seed can have a root system with good breathing and stay between the uneven surface structure 41 and the bottom surface paper 42 to absorb nutrients exchange air and grow healthily. Nevertheless, the seed is Her treated with a chemical seed-treating agent cooperating with the agent such as soda acid, gelatine or polyvinyl alcohol according to the features of the seed and the cultivating method, to protect the germination of the seed, wherein the chemical seed-treating agent is selected from a group consisting of ethylene glycol, propylene glycol, butylenes glycol, polyethylene glycol, polypropylene glycol, polybutylene glycol, glycerine and 2-octyl glycol. The seed can be seeds covered with a paper pulp, seeds covered with a polymer compound, or artificial seeds cultivated from a cell culture.

A waste cardboard case can be used when cultivating domestically. The inner surface layer of low water-preventiveness can be taken away to maintain the softness of the case and the smooth operation of sowing easily and water-absorbing. The microorganism agent for pest control is coated on the bottom surface paper 42 and the wooden anti-disease medium 31 is sprayed on the uneven surface structure 41 to produce the short-term non-irrigation crop. When the long-term non-irrigation crop is cultivated, a supporting nylon net 22 with height adjusting ability is mounted on the top of the multi-purpose paper. Alternatively, the plant can be planted on the multi-purpose paper after holes punching or on the plate with the cultivating medium, to achieve the purposes of saving fertilizer, weed control, health and non-polluting.

According to the above, it is clear that the multi-purpose paper of the present invention has the features of non-polluting, natural decomposing, enhancing the healthy root system with well breathing, and strong light-blocking. The multi-purpose paper can be carriers of agricultural antagonistic microorganisms and serve as the basic functional substrate for weed control pest control, sowing, growing seedlings, fertilization, fertilizer saving, manpower saving and organic cultivating. The multi-purpose paper can be applied to cultivate crops on the paddy fields and dry farmlands of general or organic farming, such as grains, medicinal herbs, economical plant, vegetables, fruits, and flowers. The multi-purpose paper can replace part of the plastic cultivating plate, reduce the problems of twisted roots and root system aging, make the transplanted plant stronger. The multi-purpose paper can be applied to direct-sowing of organic vegetable cultivating which has less cultivating soil, to save the manpower and prevent weed and pest. In the practical usage, the multi-purpose paper can be rolled up, and cut into a specific shape in use. It can be also directly obtained from a waste cardboard case, and can be used in the large area fields, home gardening, or golf fields. The multi-purpose paper can be applied to the domestic cultivating box containing organic soil or organic medium or the industrial applications with devices of temperature control, cold and hot water pipes, and light control. In addition, all the related materials in the present invention area biodegradable and capable of being composted, which is not limited by the soil environment and enables the achievement of the permanent operation of agricultural production.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of manufacturing a multi-purpose paper, comprising steps of:
    (a) providing a papermaking material and obtaining a clean paper pulp by treating said papermaking material;
    (b) adding a functional additive into said clean paper pulp, wherein said functional additive is Camellia seed cake's powder or Camellia seed cake's powder combined with at least one functional additive selected from a group consisting of calcium carbonate, dry strength agent, wet strength agent, weed control agent, pest control agent, bacterial control agent and a combination thereof;
    (c) processing plural steps including classifying, pulp-dispersing, coarse pulp-clarifying, fiber-separation, coarse screening, fine pulp-clarifying, heat-dispersion, fine screening, bleaching, pulp-washing and pulp-refining steps to form said multi-purpose paper; and
    (d) processing said multi-purpose paper to form thereon an uneven surface structure.

2. The method according to claim 1, wherein said papermaking material is one selected from a group consisting of waste cardboard case fibers, plant fibers and polymer fibers.

3. The method according to claim 1, wherein said Camellia seed cake's powder is added into said clean paper pulp at 1% by weight for preventing golden apple snails (Pomacea Canaliculata Lamarck) and increasing dispersive level of fibers during manufacturing.

4. The method according to claim 1, wherein said calcium carbonate is added into said clean paper pulp at a dosage based on classification of said papermaking material, sieving ratio of fibers, desired water-absorbing ability and air permeability of said paper for increasing the physical strength of said paper and promoting the proliferation of microorganisms.

5. The method according to claim 1, wherein said weed control agent is one of inorganic and organic packing materials, wherein said inorganic packing material is one selected from a group consisting of black carbon, silicon dioxide and titanium dioxide.

6. The method according to claim 1, wherein said dry strength agent is one of acidic and neutral agents of one of anionic and cationic ones selected from a group consisting of melamine formaldehyde resin, polymeric amine-epichlorohydrin resin, phenolic resin, glyoxalated polyacrylamide resin, polyacrylamide resin, raw starch, and modified starch.

7. The method according to claim 1, wherein said wet strength agent is one of acidic and neutral agents of one of anionic and cationic ones selected from a group consisting of melamine formaldehyde resin, polymeric amine-epichlorohydrin resin, phenolic resin, and glyoxalated polyacrylamide resin.

8. The method according to claim 1, wherein said uneven surface structure is an embossed structure.

9. The method according to claim 1, wherein said uneven surface structure is a corrugated structure.

10. The method according to claim 1, wherein said multi-purpose paper has a pH value ranging between about 6 and about 7.

11. The method according to claim 1, wherein said multi-purpose paper includes a corrugated paper layer having basic weight ranged from 90 $g/m^2$ to 150 $g/m^2$ and a surface paper layer having basic weight ranged from 90 $g/m^2$ to 300 $g/m^2$ in order to have high wet strength, water-preventing ability and water-permeating ability.

12. The method according to claim 1, wherein said multi-purpose paper is a paper substrate with a thickness ranged from 0.2 mm to 0.3 mm.

13. The method according to claim 1, wherein said paper substrate has a water-absorbing ability larger than Cobb, 1 Min, 20 gsm and a wet-rupture strength in longitudinal/transverse direction lower than 1.0 $kg/m^2$ after 2 hours immersion.

14. The method according to claim 1, wherein said paper substrate has a wet-breaking strength in longitudinal/transverse direction lower than 1.0 $kg/m^2$ after 2 hours immersion.

15. The method according to claim 1, wherein said multi-purpose paper has an air permeability larger than about 50 sec/100 cc.

16. The method according to claim 1, wherein said multi-purpose paper is rolled up, and cut into a specific shape in use.

17. The method according to claim 1, wherein said paper is obtained from the recycled pulp of a waste cardboard case, and can be used in one of a group consisting of large area fields, home gardening, golf fields, paddy fields and dry farmlands of general or organic farming.

18. The method according to claim 1, wherein said multi-purpose paper can be used in one of domestically cultivating box containing organic soil or organic medium and industrial applications selected from a group consisting of indoor and outdoor net supports, papery recyclable cultivating plate, and artificial indoor planting system with devices of temperature control, cold and hot water pipes, and light control.

19. The method according to claim 1, wherein said uneven surface structure is used for sowing at least a seed thereon, and said method further includes a fixing layer for fixing said seed, wherein said fixing layer comprises manufacturing steps of:
   (a) providing a papermaking material and obtaining a clean paper pulp by treating said papermaking material; and
   (b) adding at least one functional additive into said clean paper pulp to form said multi-purpose paper.

20. The method according to claim 19, wherein said fixing layer is a thin layer die-cast with at least a lattice for positioning and wrapping therein said at least a seed.

21. The method according to claim 1, wherein said multi-purpose paper has light-blocking weed-preventive ability and natural porous carriers suitable for proliferating microorganisms thereon so that one of antagonistic microorganism for controlling a specific disease of a plant, natural pest control component and bacterial control agent can be coated, sprayed or immersed thereon and said multi-purpose paper can be used for covering one of land and cultivating medium for one of sowed plant and transplanted plant.

22. The method according to claim 21, wherein said antagonistic microorganism is one of radioactive antagonistic bacterium for resisting root nodule nematode and antagonistic bacterium of radish seedling wilt disease.

23. The method according to claim 21, wherein said natural pest control component is selected from a group consisting of sodium dodecyl sulfate (SDS), linear alkyl sulfate (LAS), agricultural waste containing saponin and methyl alcohol extracted from one of Camellia seed cake and tobacco powder.

24. The method according to claim 21, wherein said one of said antagonistic microorganism, said pest control component and said bacterium control agent can be coated on the surface of said paper by an adhesive material, wherein said adhesive material is a natural neutral material of one of natural amylum gel and carboxymethyl cellulose (CMC).

25. The method according to claim 21, wherein said method further comprises a step of coating fertilizer powder or capsule on said paper by one of spraying and coating technologies, to form a slowly releasing organic or chemical fertilizer coating, thereby providing required nutrition for said plant.

26. The method according to claim 25, wherein said method adjusts a formula of said coating according to requirements and features of a specific crop, and sprays or coats on a specific position of said paper.

27. The method according to claim 25, wherein said method further comprises a step of punching plural holes on said paper to partly pierce at least one of said fertilizer coating and said uneven surface structure, and inlaying said seed in punched holes to allow said seed to root downwardly upon germination and to guide roots of said plant to grow in a room formed under said uneven surface structure.

28. The method according to claim 27, wherein said method further comprises one of a step of attaching a fixing layer on said paper by an adhesive material for securing said seed on said paper, and a step of using said paper oppositely according to a specific requirement of crops, wherein said adhesive material is one selected from a group consisting of glue spray, starch and carboxymethyl cellulose (CMC).

29. The method according to claim 27, wherein said seed is further treated according to features of said seed by using a chemical seed-treating agent cooperating with one selected from a group consisting of alginic soda acid, gelatine and polyvinyl alcohol for protecting the germination of said seed, wherein said chemical seed-treating agent is selected from a group consisting of ethylene glycol, propylene glycol, butylenes glycol, polyethylene glycol, polypropylene glycol, polybutylene glycol, glycerine and 2-octyl glycol.

30. The method according to claim 27, wherein said seed is selected from a group consisting of seeds covered with a paper pulp, seeds covered with a polymer compound, seeds of grains, seeds of medicinal herbs, seeds of greensward, seeds of vegetables, seeds of fruits, seeds of flowers and artificial seeds cultivated from a cell culture.

31. The method according to claim 27, wherein said method further comprises steps of overall embossing, punching holes, and making said uneven surface structure according to requirements of a specific crop, to increase water-absorbing ability, air permeability, size stability and limpness of dry and wet alternation.

32. The method according to claim 1, wherein said multi-purpose paper includes a corrugated paper layer having a basic weight larger than 150 g/m² and a surface paper layer having a basic weight larger than 300 g/m² in order to have relatively high wet strength, water-preventing ability and water-permeating ability.

* * * * *